United States Patent
Jacquet et al.

(10) Patent No.: US 8,934,338 B2
(45) Date of Patent: Jan. 13, 2015

(54) POLICING USAGE OF DATA NETWORKS

(75) Inventors: Arnaud Jacquet, London (GB); Andrea Soppera, London (GB); Robert J Briscoe, London (GB)

(73) Assignee: BRITISH TELECOMMUNICATIONS, public limited company, London (GB)

( * ) Notice: Subject to any disclaimer, the term of this patent is extended or adjusted under 35 U.S.C. 154(b) by 172 days.

(21) Appl. No.: 13/384,520

(22) PCT Filed: Jul. 19, 2010

(86) PCT No.: PCT/GB2010/001367
§ 371 (c)(1),
(2), (4) Date: Jan. 17, 2012

(87) PCT Pub. No.: WO2011/045553
PCT Pub. Date: Apr. 21, 2011

(65) Prior Publication Data
US 2012/0120798 A1 May 17, 2012

(30) Foreign Application Priority Data
Jul. 17, 2009 (EP) ..................................... 09251818

(51) Int. Cl.
| | |
|---|---|
| H04J 1/16 | (2006.01) |
| H04L 12/801 | (2013.01) |
| H04L 12/813 | (2013.01) |
| H04L 12/819 | (2013.01) |
| H04L 12/833 | (2013.01) |
| H04L 12/891 | (2013.01) |
| H04L 12/26 | (2006.01) |
| H04L 12/28 | (2006.01) |

(52) U.S. Cl.
CPC ............ *H04L 47/10* (2013.01); *H04L 43/0882* (2013.01); *H04L 47/11* (2013.01); *H04L 47/12* (2013.01); *H04L 47/20* (2013.01); *H04L 47/215* (2013.01); *H04L 47/31* (2013.01); *H04L 47/33* (2013.01); *H04L 47/35* (2013.01); *H04L 47/41* (2013.01); *Y02B 60/33* (2013.01)
USPC ............................. 370/230; 370/235; 370/253

(58) Field of Classification Search
None
See application file for complete search history.

(56) References Cited

U.S. PATENT DOCUMENTS

| | | |
|---|---|---|
| 2008/0008090 A1 | 1/2008 | Gilfix |
| 2008/0037552 A1 | 2/2008 | Dos Remedios et al. |
| 2012/0092995 A1* | 4/2012 | Arvidsson et al. ............ 370/235 |

FOREIGN PATENT DOCUMENTS

| | | |
|---|---|---|
| EP | 1705851 | 9/2006 |
| WO | WO 2005096566 | 10/2005 |

(Continued)

OTHER PUBLICATIONS

Raghavan, B et al., • "Cloud Control with Distributed Rate Limiting": http://www.cs.ucla.edu/classes/cs217/SIG07Award.pdf, 12 pages, retrieved Oct. 1, 2013.*

(Continued)

*Primary Examiner* — Ayaz Sheikh
*Assistant Examiner* — Sori Aga
(74) *Attorney, Agent, or Firm* — Nixon & Vanderhye PC

(57) ABSTRACT

Methods and systems for policing usage by one or more users (12) of a data network (14), said one or more users (12) being able to send, to receive, or to send and receive data over the network via one or more of a plurality of access nodes (42), the usage of the data network resulting from respective data units consuming network resources along respective paths across the data network (14), each of said data units being associated with one of a plurality of subsets of the usage of the data network, said data units having congestion indications associated therewith indicating a measure of their congestion impact.

20 Claims, 7 Drawing Sheets

Token Bucket Congestion Policer

(56) References Cited

FOREIGN PATENT DOCUMENTS

| WO | WO 2005096567 | 10/2005 |
|---|---|---|
| WO | WO 2006/108282 | 10/2006 |

OTHER PUBLICATIONS

International Search Report for PCT/GB2010/001367 mailed Sep. 1, 2010.

Written Opinion of the International Searching Authority mailed Sep. 1, 2010.

Briscoe, B et al.: "Re-ECN: Adding Accountability for Causing Congestion to TCP/IP", Rransport Area Working Group, IETF Internet-Draft, Mar. 3, 2009, http://tools.ietf.org/id/draft-briscoe-tsvwg-re-ecn-tcp-07.txt ,48 pages, retrieved Jan. 17, 2012.

Jacquet, et al.: "Policing Freedom to Use the Internet Resource Pool", Workshop on Re-Architecting the Internet (ReArch'08) (Dec. 2008), http://bobbriscoe.net/projects/refb/polfree_rearch08.pdf , 6 pages, retrieved Jan. 17, 2012.

Newcomer E, et al.: "Understanding SOA with Web Services", Addison-Wesley Professional, Dec. 24, 2004, http://www.amazon.com/Understanding-SOA-Services-Eric-Newcomer/dp/0321180860, 480 pages, retrieved Jan. 17, 2012.

Buyya, R, et al., "Market-Oriented Cloud Computing: Vision, Hype, and Reality for Delivering IT Services as Computing Utilities": http://arxiv.org/ftp/arxiv/papers/0808/0808.3558.pdf, 9 pages, retrieved Jan. 17, 2012.

Floyd, S et al., "Random Early Detection Gateways for Congestion Avoidance": IEEE/ACM Transactions on Networking, vol. 1-4 (397-413) Aug. 1993, http://dl.acm.org/citation.cfm?id=169935, retrieved Jan. 17, 2012.

Ramakrishnan, K, et al., "The Addition of Explicit Congestion Notification (ECN) to IP":RFC 3168, Sep. 2001: http://tools.ietf.org/rfc/rfc3168.txt, 59 pages, retrieved Jan. 17, 2012.

Briscoe, Jacquet, Di Cairano-Gilfedder, Salvatori, Soppera & Koyabe: "Policing Congestion Response in an Internetwork using Re-feedback": In Proc ACM SIGCOMM'05, Computer Communications Review 35(4) (Sep. 2005): http://portal.acm.org/citation.cfm?id=1080124, retrieved Jan. 17, 2012.

Raghavan, B et al., : "Cloud Control with Distributed Rate Limiting": http://www.cs.ucla.edu/classes/cs217/SIG07Award.pdf, 12 pages, retrieved Jan. 17, 2012.

* cited by examiner

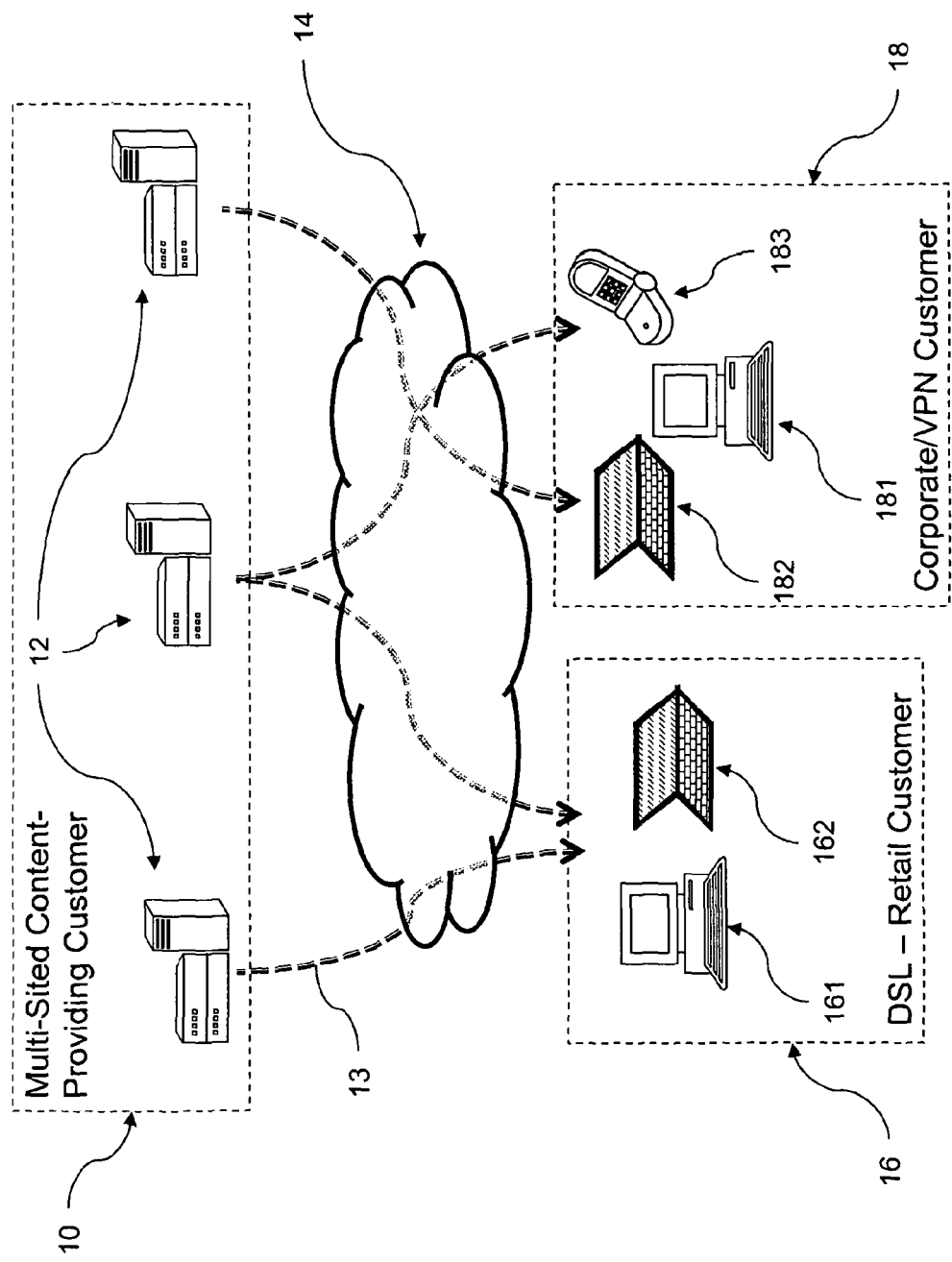
Figure 1 - CDN Network Scenario

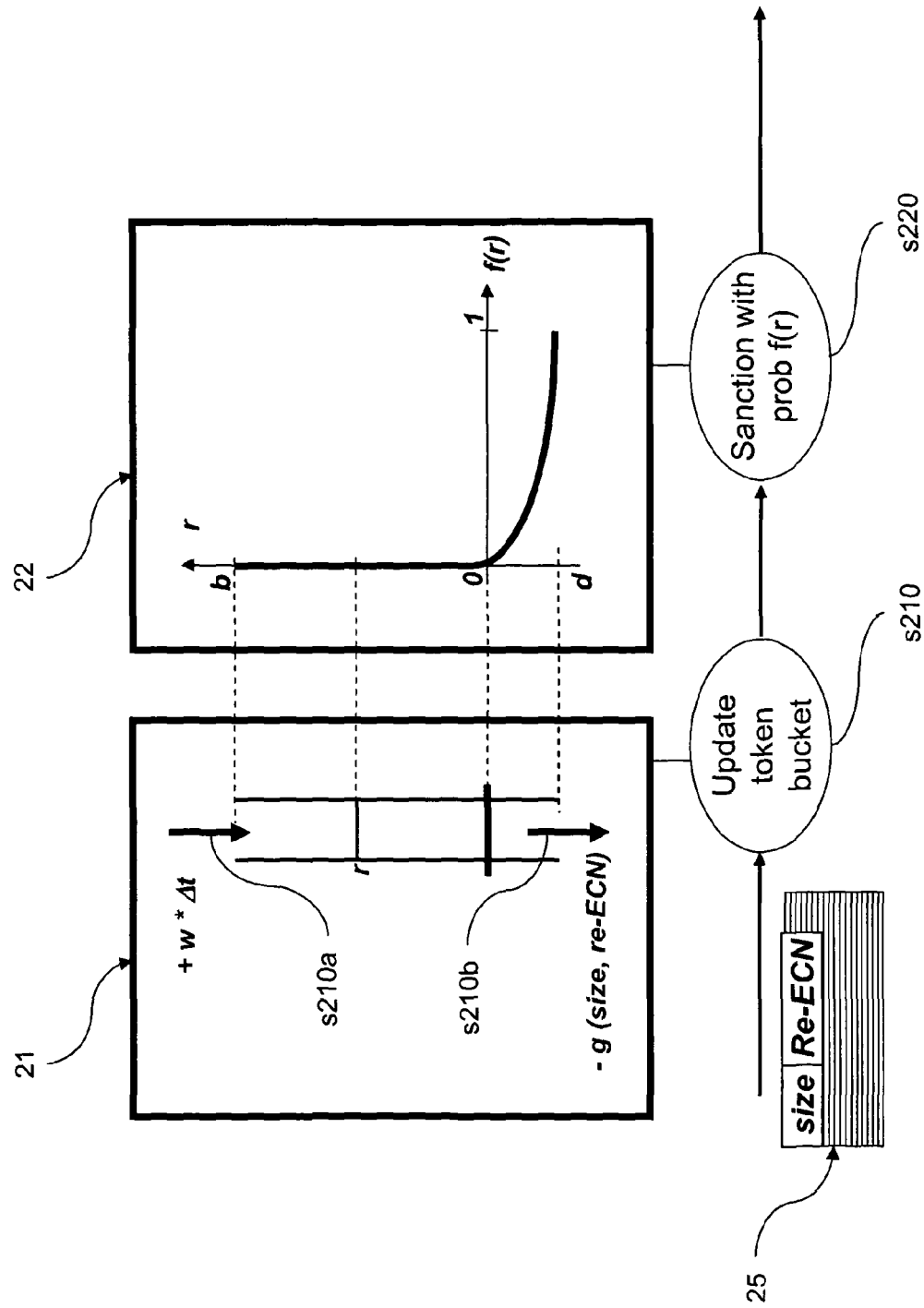
Figure 2 - Basic Congestion Policer

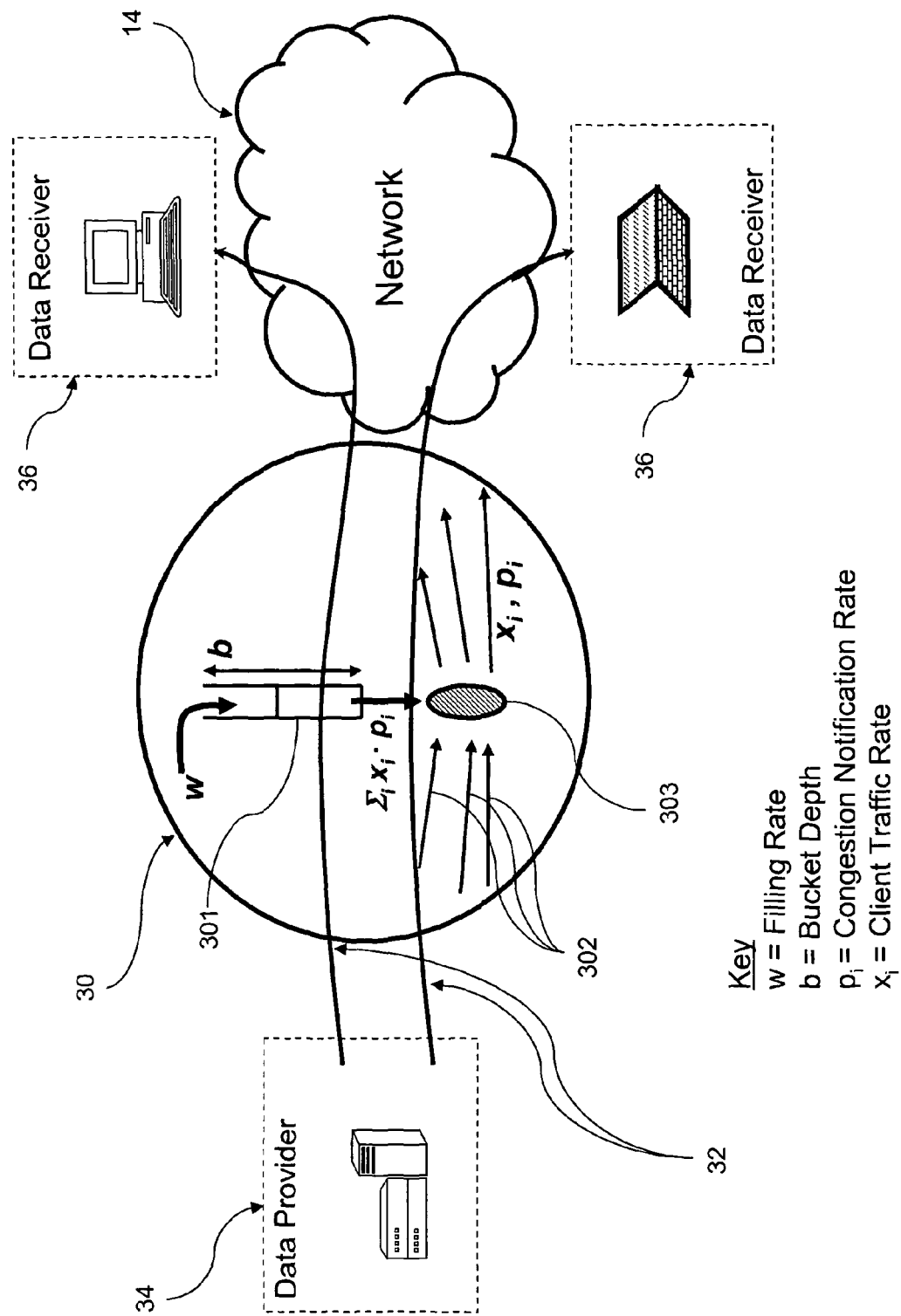
Figure 3 - Token Bucket Congestion Policer

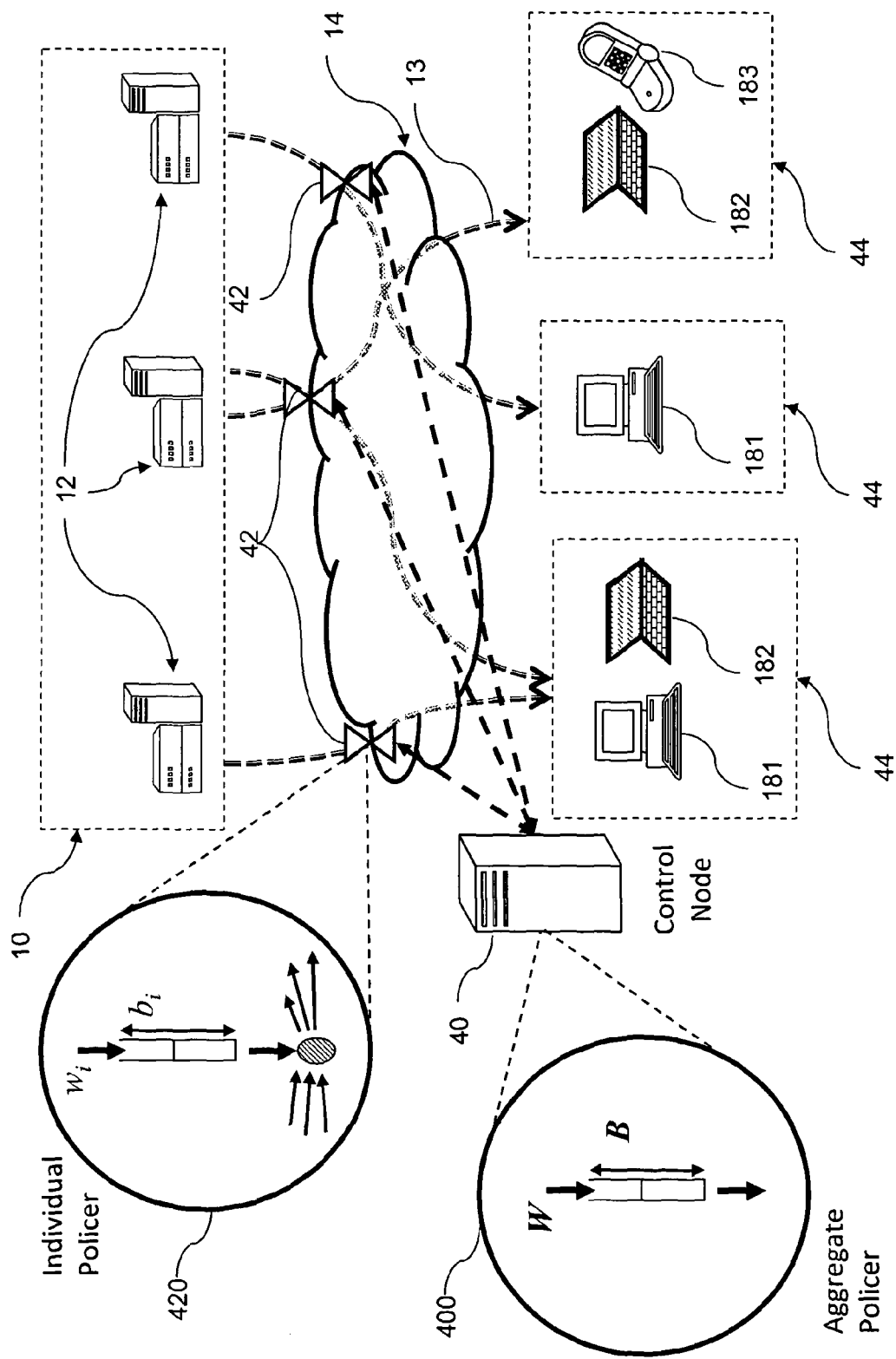
Figure 4 - Policing Congestion with Distributed Token Buckets

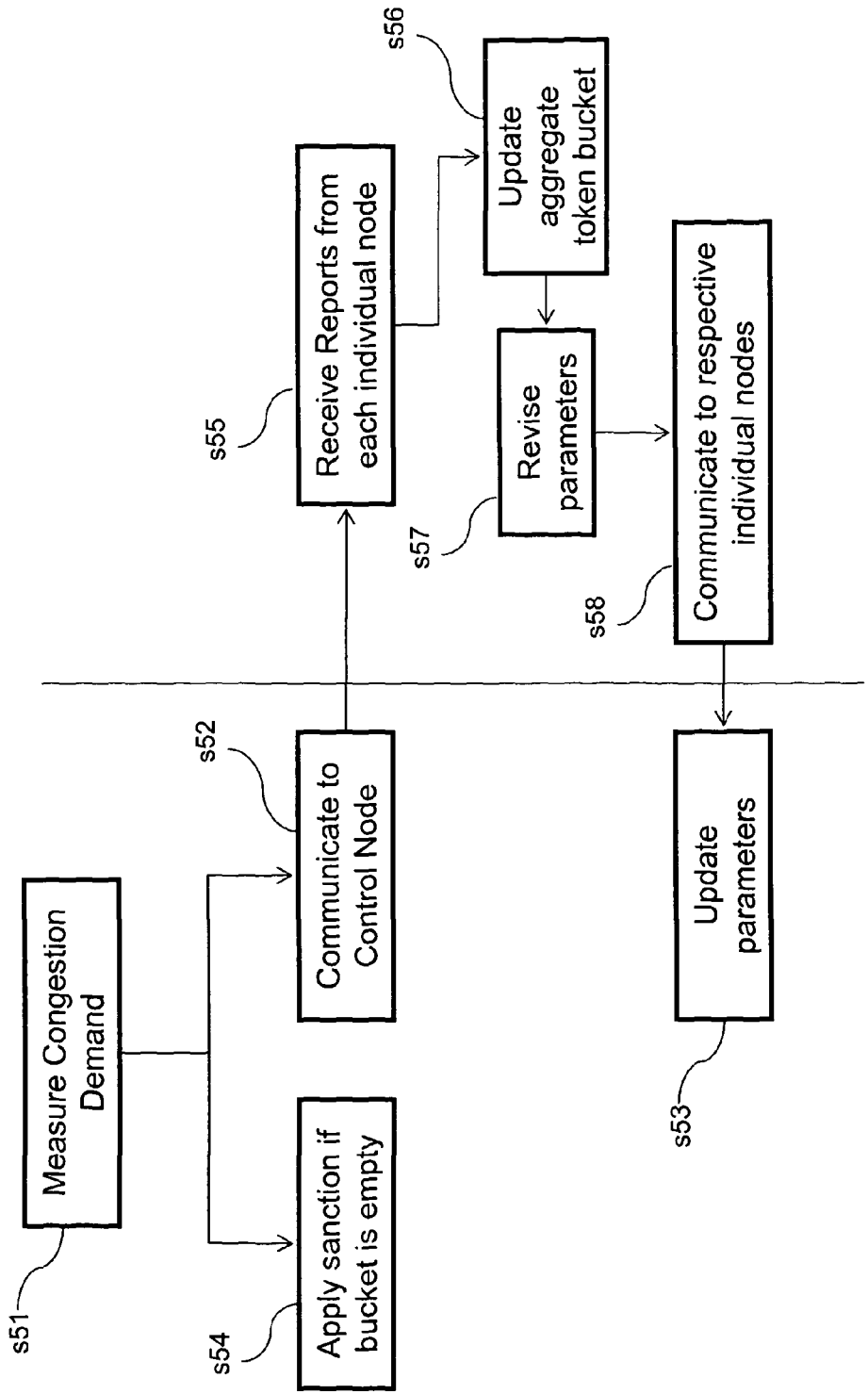
Figure 5(a) - Policing Congestion with Distributed Token Buckets – Arrangement with Control Node

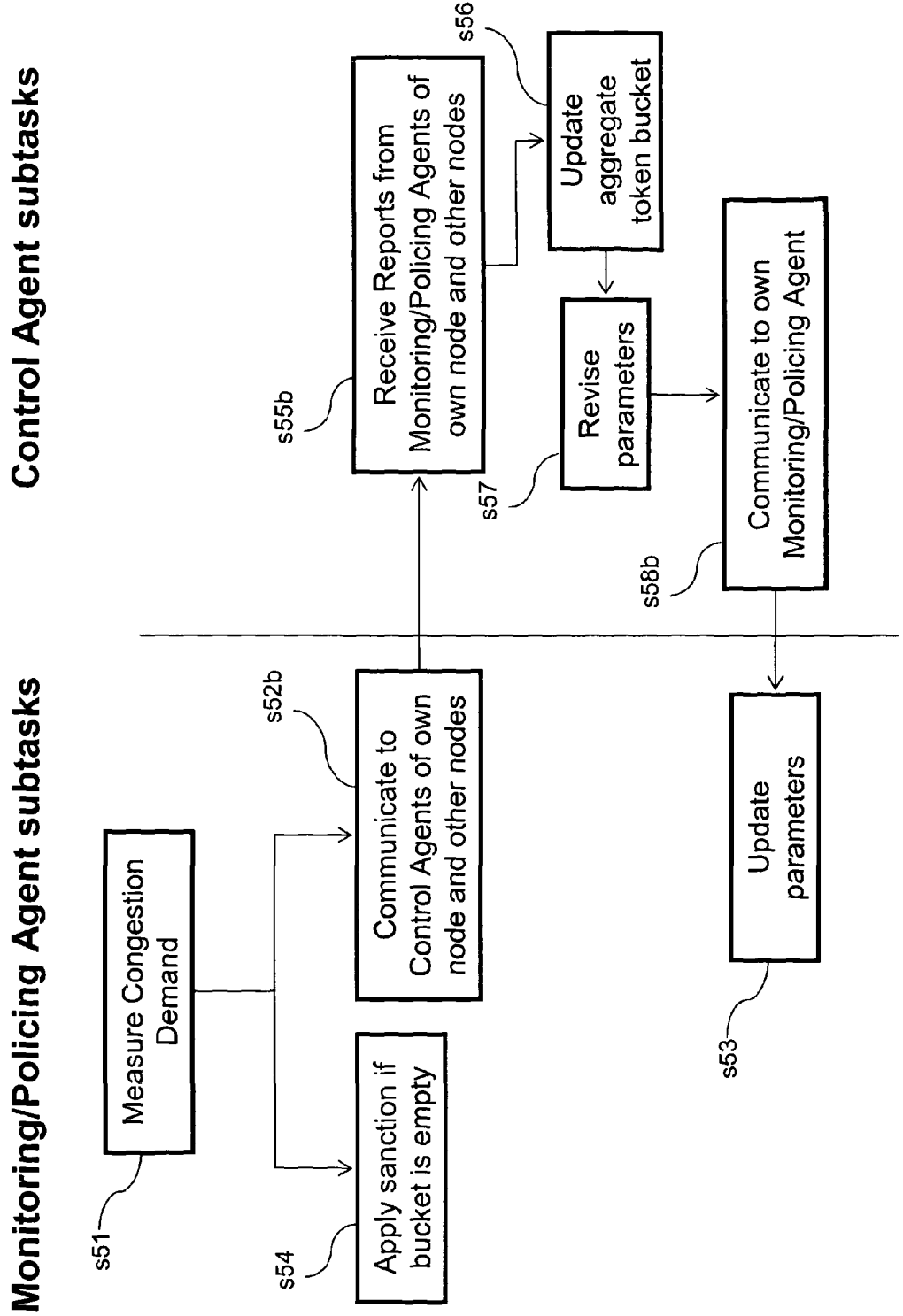
Figure 5(b) - Policing Congestion with Distributed Token Buckets - Arrangement without Control Node

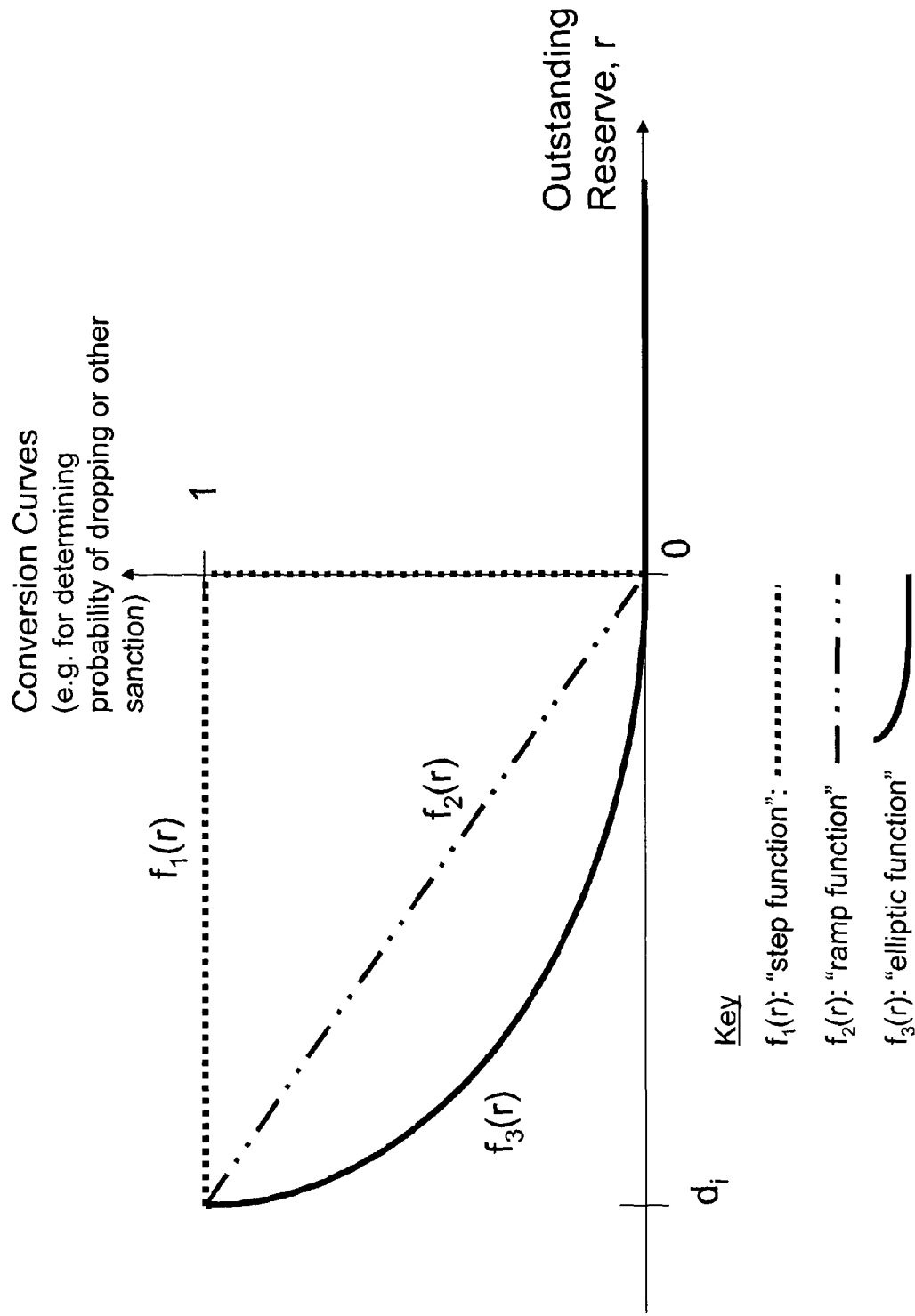
Figure 6 - Overdraft behaviour

POLICING USAGE OF DATA NETWORKS

This application is the U.S. national phase of International Application No. PCT/GB2010/001367 filed 19 Jul. 2010 which designated the U.S. and claims priority to EP 09251818.2 filed 17 Jul. 2009, the entire contents of each of which are hereby incorporated by reference.

TECHNICAL FIELD

The present invention relates to policing the usage of data networks. More specifically, aspects of the present invention relate to methods and apparatus for policing usage of a data network by one or more users each able to send and/or receive data over the network via one or more of a plurality of access nodes.

BACKGROUND TO THE INVENTION AND PRIOR ART

Managing Distributed Computing

Large/multi-sited customer connectivity requirements are based on various parameters: number and location of sites, traffic volume, quality of service for specific applications, etc. It is hard for a customer to plan the exact amount of network resources for a specific location. At the same time for an operator cost of access networks are dependent on customer location and it is complex to control these costs prior to winning customers. We focus our effort on a distributed management system that aims to improve customer flexibility and reduce operator costs.

This work is motivated by the way distributed systems are evolving in the current Internet market place. In the past, distributed computing was mainly represented by server farms managed by a single organisation with an integrated set of applications and specific network requirements.

The current trend is to deploy new services and applications on third party hosted platform across the Internet. The success of Service Oriented Architecture (SOA) has motivated the development of services and functions accessible over the networks. SOA is based on the concept of loose coupling among applications/services and physical resources.

In this way software developers can combine and reuse these functions to develop new business applications. For example, Amazon Elastic Computer Cloud (EC2) is an example of how SOA is changing the distributed computing world. The solution provides a grid computing model where several servers can be deployed in clusters to provide scalability and high availability. The aim is to provide an infinite amount of computing resource to any customer that is willing to pay for it.

The economic concept behind this is the need for agile corporations to sell their underutilised computing assets and hire additional computing when the demand for new services increases. What is important in the context of this work is the ability to provide a dynamic provision of resources scaling up and down based on application requirements. The aim is to enable not only optimal usage of infrastructure but also enable major cost savings in terms of energy consumption and better power management.

Managing distributed network usage in a distributed environment has significant technical hurdles. Customers and service providers cannot plan in advance the requirements for each distributed component.

Developments Relating to Distributed Computing

Various developments relating to distributed computing are considered to be of relevance to the specific technology to which the present invention relates, and will therefore be discussed briefly.

1) Service Oriented Architecture and Grid Computing: Service Oriented Architecture (SOA) has evolved as a form of service design where modular components can be assembled to design distributed services. The style of distribution can range from a vertical integrated co-located system to global scale grid computing made up by vast number of system operated by different organisations. Today major Internet-based organisations (Google, Amazon, Yahoo) exploit these concepts to implement and design scalable services.

SOA is discussed further in the article: "*Understanding SOA with Web Services*", Eric Newcomer & Greg Lomow, Addison Wesley (2005). ISBN 0-321-18086-0.

2) Content Distribution Networks and Cloud-Based Services: Content Distribution Networks (CDNs) provide a mechanism capable of providing an improved Internet experience for end-users. CDN servers may be distributed among geographical locations and may thus be physically closer to end-users. In this way they may provide a faster and more reliable Internet experience. With popular content services such as those provided by video sharing and downloading websites such as "YouTube" and such as the video and audio streaming service known as the "BBC i-Player", CDN operators may need to limit the bandwidth that a user can consume. As will later be understood, however, even where CDN networks are used, particularly popular or high-volume content-providing users can still create congestion to a problematic degree on CDN networks.

Cloud Computing is further discussed in the article: "*Market-Oriented Cloud Computing: Vision, Hype, and Reality for Delivering IT Services as Computing Utilities*", Rajkumar Buyya, Chee Shin Yeo, Srikumar Venugopal, Department of Computer Science and Software Engineering, The University of Melbourne, Australia. Retrieved on 2008-07-31.

FIG. 1 illustrates a CDN scenario where a multi-sited content provider 10 has or makes use of several CDN servers 12 able to provide content to its end-users via a shared network resource 14, for example a cloud infrastructure. (It will be understood that the CDN servers may be under the control of the content-provider organisation, or may be under the control of a separate organisation of which the content-provider organisation is a client. For the purposes of this explanation, it is sufficient to regard the organisation which controls the CDN servers as the content provider, even if the initial content provider is in fact one step removed from this role.) The content provider 10 and its one or more end-user customers 16, 18 are themselves customers of a network provider responsible for providing the shared network resource 14. The curved dashed lines 13 in FIG. 1 (and later in FIG. 4) symbolise the data flow or traffic from CDN servers 12 (belonging to content provider 10) to content-receiving end-users. The end-users may include one or more "retail customers" 16, one of which is shown symbolically as having a desktop computer 161 and a laptop computer 162, and/or one or more "corporate customers" 18, one of which is shown symbolically as having a desktop computer 181, a laptop computer 182 and a mobile phone device 183. Corporate customers in particular are in fact likely to have several individual users and/or individual access points, each of which may have one or more such associated devices, possibly all forming part of a Virtual Private Network (VPN). This figure is intended to illustrate the types of entities that may be involved in an example scenario for which embodiments of the present invention may be applicable.

Developments Relating to Rate Control, Congestion Signalling and Policing in Data Networks Various developments relating to rate control, congestion signalling and policing in data networks are considered to be of relevance to the specific technology to which the present invention relates, and will therefore be discussed briefly.

It will be understood that data traversing a network such as the Internet follows a path between a series of routers, controlled by various routing protocols. Each router seeks to move packets closer to their final destination. If too much traffic traverses the same router in the network, the router can become congested and packets start to experience excessive delays whilst using that network path. If sources persist in sending traffic through that router it could become seriously overloaded (congested) and even drop traffic (when its buffers overflow). If sources still persist in sending traffic around this bottleneck it could force more routers to become congested, and if the phenomenon keeps spreading, that can lead to a congestion collapse for the whole Internet—which occurred regularly in the mid-eighties.

1) Rate Control: A solution to that problem has been to ensure that sources take responsibility for the rate at which they send data over the Internet by implementing congestion control mechanisms. According to these mechanisms, sources are required to monitor path characterisation metrics to detect when the path their data is following is getting congested, in which case they react by reducing their throughput. In the absence of such congestion indications, they may slowly increase their throughput. The congestion level is one of the parameters controlling the rate adaptation of a source sending data over a congested path.

2) Implicit Congestion Signalling: The congestion level can be signalled either implicitly (through congested routers dropping packets when their buffers overflow or to protect themselves) or explicitly (through mechanisms such as explicit congestion notification—see next subsection). Currently the most common option is implicit signalling. Historically, routers would drop packets when they became completely saturated (which happens when a traffic burst cannot be accommodated in the buffer of the router)—this policy is called "Droptail". Random Early Detection (RED) (see reference below) is an improvement where routers monitor the average queue length in their buffer and when this is higher than a given threshold, start to drop packets with a probability which increases with the excess length of the queue over the threshold. It is widely used in today's internet because it allows sources to react more promptly to incipient congestion. Sources using Transmission Control Protocol (TCP) are able to detect losses, because a packet loss causes a gap in the sequence; whenever a TCP source detects a loss, it is meant to halve its data transmission rate, which should alleviate the congestion on the router at the bottleneck.

RED is discussed further in the article: S Floyd & V Jacobson: "*Random Early Detection Gateways for Congestion Avoidance*", IEEE/ACM Transactions on Networking, Vol 1-4 (397-413) August 1993.

3) Explicit Congestion Notification: Explicit Congestion Notification (ECN) (see reference below) further improves on RED by using a two-bit ECN field in the Internet Protocol (IP) header to signal congestion. It runs the same algorithm as RED, but instead of dropping a packet, it sets its ECN field to the Congestion Experienced (CE) codepoint. The ECN standard requires a sender to echo any congestion mark signalled in the data; for instance, a TCP receiver sets the Echo Congestion Experienced (ECE) flag in the TCP header, which the TCP source interprets as if a packet has been dropped for the purpose of its rate control. In turn the source then reacts to the congestion by halving its transmission rate and notifies the receiver of this using the Congestion Window Reduced (CWR) codepoint.

ECN thus allows routers to signal network congestion. This may be used to reduce TCP re-transmission and to increase overall network throughput.

The four values of the two-bit ECN field in the IP header are:

Non ECT, which signifies that the packet belongs to a flow that doesn't support ECN.

ECT(0) and ECT(1), which signify that the packet belongs to a flow that supports ECN but that upstream routers haven't had cause to mark the packet.

Congestion Experienced (CE), which signals that a packet has experienced incipient congestion.

ECN is discussed further in the following article: K Ramakrishnan, S Floyd & D Black: "*The Addition of Explicit Congestion Notification (ECN) to IP*", RFC 3168, September 2001.

4) Re-Feedback: The re-feedback framework has been developed to allow for network users' usage to be accounted for based on the congestion externality they cause to other users. It will be understood that one of the functions of the IP header is to carry path information from a sender to a receiver. This path information allows downstream nodes (nodes nearer the receiver) to learn about the upstream state of the path. Mechanisms exist which allow the receiver to feed this information back to the sender. The re-feedback proposal (see reference below, for example) provides a mechanism whereby path information that a receiver feeds back to a sender can be re-inserted into the forward data path, thus allowing nodes along the path to learn information relating to the downstream state or the path as well as information about the upstream state of the path.

The re-feedback proposal is further discussed in the article: "*Policing Congestion Response in an Internetwork using Re-Feedback*", Bob Briscoe, Arnaud Jacquet, Carla di Cairano Gilfedder, Alessandro Salvatori, Andrea Soppera and Martin Koyabe, ACM Sigcomm 2005

International patent applications WO 2005/096566 and WO 2005/096567 relate to data networks, and to nodes making up parts of data networks, arranged to derive information relating to the characterisation of paths taken by data travelling between nodes in the networks according to the re-feedback proposal.

Mechanisms based on the re-feedback approach can be used to enable or cause multiple users to share resources relating to Internet capacity in a fair manner. Some such mechanisms may enable light users to increase their usage of network resources even in periods of network congestion while heavy users may be provided with an incentive to improve resource management control. In particular the re-feedback approach may be used to enable network service providers to obtain information about the congestion volume that each user creates.

5) Re-ECN: Re-ECN is an example of a system based on the ECN mechanism that utilises the re-feedback concept, whereby path information that a receiver feeds back to a sender can be "re-inserted" into the forward data path, in order to provide upstream and downstream congestion information throughout the network. With re-ECN, the information "re-inserted" is based on ECN marks in previously transmitted packets. It is similar to ECN but uses an extra bit in the packet header. This bit enables a number of new codepoints to be used. A simple way to understand the re-ECN protocol is to think of each packet as having a different colour flag (corresponding to a codepoint). At the start of a flow, a green flag (FNE or "feedback not established") is used to indicate that a sender doesn't have existing knowledge of the path. Green flags are also used when the sender is unsure about the current state of the path. By default packets are marked with grey flags. If they encounter congestion during their progress through the network they are marked with a red flag. The destination will send back a count of the number of red flags it has seen. For every red flag it is informed of, the sender should send a packet with a black flag (re-echo). These black flags cannot be modified once they are set by the sender, so signal to a node at any point on the path what the total end-to-end congestion is expected to be (based on the fact that the number of black flags signals the total end-to-end congestion level actually experienced by the immediate predecessors of the current packets). At any intermediate node the upstream congestion is given by the number of red flags seen, and the downstream congestion may therefore be derived by the difference between the number of red flags and the number of black flags.

By "re-inserting" ECN information on the forward path, the re-ECN mechanism provides information which may be used to allow policing of network traffic to be performed in dependence on the contribution to network congestion being caused by the traffic, rather than simply on the volume of the traffic, thereby allowing a limit to be set and policed based on the amount of congestion a specific user may cause.

Re-ECN is further discussed in the article: "*Re-ECN: Adding Accountability for Causing Congestion to TCP/IP*"; Bob Briscoe, Arnaud Jacquet, Toby Moncaster & Alan Smith, IETF Internet-Draft <draft-briscoe-tsvwg-re-ecn-tcp-07.txt> (March 2009).

Various mechanisms have been proposed based on the concept referred to above as "re-ECN". One such proposed mechanism, which will be explained with reference to FIG. 2 (and which is discussed in further detail in the reference above) consists of taking what can be regarded as a "classic" token bucket policer (which would react to the volume of traffic generated by a user) and adapting this such that it reacts based on the amount of congestion a user creates in the network, rather than simply the volume of traffic the user generates. Such a mechanism is therefore referred to as a "Congestion Policer", rather than a "Rate Policer", and will be discussed in the next section.

Further discussion of why congestion policing is believed to be particularly effective in relation to policing the usage of pooled resources is given in the following article: "*Policing Freedom to Use the Internet Resource Pool*", Arnaud Jacquet, Bob Briscoe & Toby Moncaster, Workshop on Re-Architecting the Internet (ReArch'08) (December 2008).

6) A Basic Congestion Policer: As illustrated in FIG. 2, token bucket 21 is filled at a constant rate, and emptied in proportion to the contribution of the user's traffic to network congestion. First, when a packet 25 arrives at the policing node, the token reserve r is updated (step s210). This updating involves two factors: the token reserve r is updated by adding tokens in proportion to a predetermined congestion allowance w of the user (step s210*a*). The token reserve r is also updated by removing tokens (step s210*b*) according to a function g( ) whose value depends on information retrieved from the packet header, in particular the size $s_i$ and the re-ECN field (which reflects a congestion level $p_i$). The function g( ) could be defined as:

| g(packet) = $s_i$ | if the re-ECN codepoint signals a mark |
| g(packet) = 0 | otherwise |

Subsequently, the packet may be subjected to a sanction (step s220) according to a relevant policy (indicated by graph 22) with a probability f(r) where the sanction curve f( ) is null so long as the value of the token reserve r remains positive.

Such a mechanism may be used to put an upper bound on the amount of congestion a user can cause.

Congestion Policing

In the light of the explanations given above, it will be understood that a congestion policer may be used to police traffic being sent by a data-providing entity (such as one of the CDN servers 12 in FIG. 1) to a data-receiving entity (such as one of the end-users 16 and 18 in FIG. 1). Such policing would be reasonably simple to implement in a scenario in which a single data-providing entity is providing data via a network to a single data-receiving entity—this could be achieved by locating a suitable policing node either at the access point via which the data-providing entity is connected to the network, or at the access point via which the data-receiving entity is connected to the network. In a more complex scenario in which a single data-providing entity is providing data via a network to more than one data-receiving entities each having its own access point via which it is connected to the network, it would again be reasonably simple to implement congestion policing in respect of the data-providing entity by locating a suitable policing node at the access point via which the data-providing entity is connected to the network. Such policing would effectively concentrate on the behaviour of the data-providing entity. The function of a suitable policing node based on a token bucket congestion policer in this scenario will be explained below with reference to FIG. 3. Likewise, in a reverse scenario in which a single data-receiving entity is receiving data via a network from more than one data-providing entities, it would again be reasonably simple to implement congestion policing in respect of the data-receiving entity by locating a suitable policing node at the access point via which the data-receiving entity is connected to the network. Such policing would effectively concentrate on the behaviour of the data-receiving entity.

In FIG. 3 a token bucket congestion policer 30 is illustrated. This is shown as policing traffic 32 flowing from a data providing entity 34 (for example a digital media content providing organisation having one or more CDN servers 12 such as those shown in FIG. 1) to one or more data receiving entities 36 (such as customer 16 in FIG. 1, for example) via a network 14. According to the "token bucket" model, tokens are added to the bucket 301 at a constant rate w, but unlike policing using a "classic" token bucket policer (in which tokens are consumed simply in proportion to the volume of traffic passing through the policer), tokens are instead consumed in proportion to the congestion caused or expected to be caused by the traffic passing through the policer. As will be understood, an appropriate measure of the congestion caused or expected to be caused by packets in a flow can be obtained from congestion indications such as ECN or re-ECN marks carried by the packets.

In FIG. 3, the traffic 32 is shown within policer 30 as comprising a number "N" flows 302 traversing a path across the network via a policing node 303. In abstract terms, that means that the rate at which tokens are consumed from the bucket 301 is $\Sigma p_i x_i$, where $x_i$ is the throughput of flow i=1 . . . N , and $p_i$ is the amount of congestion on its path. In practice this means that every time a packet is forwarded, tokens are consumed in proportion to the amount of congestion declared in the packet. In the case of re-ECN, this may mean a token is consumed every time a packet carrying a re-ECN mark is forwarded.

Alternatively, the nominal token size may be defined as one byte, for example, and the number of tokens removed for forwarding a congestion-marked packet could be in proportion to the size of the packet. At any point in time the amount of tokens left in the bucket represents the outstanding reserve available to the user for future use.

As is usually the case with the "classic token bucket" model, tokens may be discarded when the bucket is full, and sanctions (such as dropping packets, imposing penalties on users etc.) may start to be applied when the bucket is empty. As will be explained in detail later, the transition to sanctioning behaviour may be progressive, or alternatively it may be stepped-up immediately on a threshold ("empty") being passed.

It should be noted that if a customer's usage (in the case of FIG. 3, the usage of data provider 34 as measured at congestion policer 30) stays below an agreed congestion allowance, the policer 30 merely monitors the traffic passively. However, as soon as the congestion rate empties the bucket the policer 30 may take policing action, such as applying a penalty to the traffic, imposing some other sanction, marking traffic (with additional marks in packet headers, for example) or issuing reports in respect of the transgression. By imposing a policing sanction such as dropping some traffic that was received marked with a congestion indication, for example, the policer can keep the customer within the predefined congestion allowance.

As outlined earlier, developments in relation to content provision have resulted in some customers of a network provider being "multi-homed". This may be because the customer of the network provider is an organisation such as the multi-sited content provider 10 in FIG. 1, or because the customer is an organisation such as the corporate customer 18 in FIG. 1. In either case, mechanisms such as those above would only allow the behaviour of individual users at separate sites to be monitored separately, with a policer operating autonomously in respect of each site. In a distributed network environment, this may be easily abused, or may fail to have the required effect on the behaviour of the customer or its individual users. Proposals to deal with the control of resource allocations in a distributed network environment will be outlined in the next paragraph.

Distributed Resource Allocations

These research solutions discuss mechanisms to control resource allocations in a distributed network environment.

An article by Raghavan et al (see below) includes a discussion of the problem of distributed rate limiting as a mechanism to control the aggregate bandwidth that a customer is generating in the network. The approach suggested can be seen as a continuous form of admission control where policers placed at the edges of the network admit traffic until the aggregate bandwidth consumed by a customer has reached a certain volume or rate level.

This approach coordinates a set of distributed traffic rate limiters while retaining the behaviour of a centralised limiter. The solution chooses a token-bucket as a reference model to monitor the traffic rate at the different distributed locations. The solution assumes that among the different limiters, broadcast communication exists. A "gossip protocol" is used to enable a resilient and robust communication framework. At the end of each estimation interval the various limiters update the global demand estimates at a set of limiters.

The mechanism proposed is appropriate to rate limiting a large amount of flows in a distributed location. However, this mechanism assumes that if each user is TCP-friendly then the mechanism provides fair distribution of resources. Unfortunately a user that opens a large number of TCP sessions can gain an advantage over another user that is using only one session or a smaller number of sessions. This mechanism allocates a similar share of bandwidth to each TCP flow.

See: "*Cloud Control with Distributed Rate Limiting*", Barath Raghavan, Kashi Vishwanath, Sriram Ramabhandran, Kenneth Yocum & Alex C. Snoeren, UCSD, ACM Sigcomm 2007

Similar mechanisms to this are suggested in European patent application EP1705851 and patent application US2008/008090. Both describe mechanisms to manage a capacity constraint that is shared between different users, and rely on token bucket or leaky bucket mechanisms. However, as with the approach proposed in the Raghavan reference above, the policer doesn't take into consideration the congestion impact of the traffic.

OTHER PRIOR ART

International patent application WO 2006/108282 relates to traffic shaping, and in particular to methods and apparatus for an application aware traffic shaping service node positioned between a core network and one or more access networks. Per subscriber, per application traffic policies are enforced for network traffic between subscribers communicatively connected through access network and service providers communicatively connected through a core network. The enforcement of such a policy may comprise classifying the network traffic into application level subscriber flows, maintaining real-time statistics on the application level subscriber flows and overall network element congestion, updating, in real-time, the per subscriber, per application traffic policy based on the real-time statistics and restricting bandwidth and dropping packets on the application level subscriber flows as necessary to enforce the traffic policy. It will be noted that the characteristics monitored relate to volume of data (i.e. numbers of packets and bytes).

United States patent application US2008/037552 relates to methods and systems for providing quality of service in packet-based core transport networks. A feedback control loop is implemented wherein probes at various points in a network check for congestion states to guide bandwidth management threshold decisions in order to maintain a condition of non-congestion throughout the network. Capacity planning and congestion avoidance mechanisms aim to work hand-in-hand to fulfil Service Level Agreements (SLAs). It will be noted that simple utilisation metrics are used to drive any threshold adjustment.

In order to create a fair mechanism to share resources in a resource pool type of network, the present inventors have realised that improved results may be achieved by using congestion information, rather than simply using information relating to data volume or rate. Congestion metric information such as ECN carries information about the effect that the traffic of a specific user has on the traffic of other users sharing the same resource pool. By exploiting congestion instead of volume or rate, it becomes possible to enable users to compete against each other in a fair manner.

Further, the present inventors have realised that it would be advantageous to allow the total amount of congestion resource (rather than just volume) to be fixed for a specific customer while allowing the consumption of the congestion resource to be shared dynamically among the various locations and/or individual users overseen by or controlled by the customer. The overall constraint is to maintain congestion always below the overall aggregate, which may be agreed as a part of the customer's contract with the network provider.

SUMMARY OF THE INVENTION

According to a first aspect of the present invention, there is provided a method of policing usage by one or more users of a data network, said one or more users being able to send, to receive, or to send and receive data over the network via one or more of a plurality of access nodes, the usage of the data network resulting from respective data units consuming network resources along respective paths across the data network, each of said data units being associated with one of a plurality of subsets of the usage of the data network, said data units having congestion indications associated therewith indicating a measure of their congestion impact, the method comprising:

in respect of each of said plurality of access nodes:
    monitoring congestion indications associated with received data units associated with a particular usage subset and determining in dependence on said congestion indications a subset-specific congestion contribution in respect of said usage subset;
    performing a policing operation in respect of said received data units in dependence on subset-specific policing parameters associated with said access node and in dependence on said subset-specific congestion contribution; and
    providing, to at least one control agent, subset-specific congestion information indicative of said subset-specific congestion contribution;

and
at said at least one control agent:
    receiving subset-specific congestion information indicative of respective subset-specific congestion contributions from a plurality of said access nodes;
    updating an aggregate congestion measure in dependence on said subset-specific congestion contributions;
    determining, in respect of at least one of said access nodes, updated subset-specific policing parameters in dependence on said subset-specific congestion contributions and on said updated aggregate congestion measure; and
    providing said updated subset-specific policing parameters for use in the performance of a policing operation by said at least one access node.

As will be explained in more detail later, a congestion indication is preferably "associated with" a data unit by virtue of the congestion indication being provided by one or more fields of one or more header portions of the data unit. The ECN field in the IP header is an example of such a field specifically provided for the purposes of providing congestion indications, but it will be understood that other such fields may also be used in relation to IP or other protocols (or may be available for such use in the future). Also, it is foreseeable that a congestion indication associated with a particular packet may be provided in a manner other than by virtue of being in a header portion of the packet in question.

Such congestion indications may indicate a measure of the "congestion impact" of the data unit with which they are associated. The "congestion impact" may relate to whether the data unit in question has already experienced congestion "upstream" (e.g. at any router on the path across the network so far, i.e. from a sender node to the node that the data unit has reached), or whether it is expected to experience congestion "downstream" (e.g. at any router on the onward path across the network, i.e. from the node that the data unit has reached to an eventual intended receiver node).

According to preferred embodiments, each of said plurality of access nodes may provide said subset-specific congestion information to a common control agent, which is then able to perform the steps of (a) determining, in respect of a plurality of said access nodes, said updated subset-specific policing parameters; and (b) providing said updated subset-specific policing parameters for use in the performance of policing operations in respect of said plurality of access nodes. The common control agent may be located at one of the access nodes, which may thus perform the dual role of being an individual access node as well as being the control agent for this access node and other access nodes. Alternatively, the common control agent may be at a location remote from said plurality of access nodes, in which case it may be regarded as a "dedicated" control agent.

According to alternative preferred embodiments, respective access nodes may each provide their subset-specific congestion information to associated control agents and to one or more other control agents associated with one or more other access nodes; each of said control agents then being able to perform the steps of (a) determining, in respect of an access node with which it is associated, said updated subset-specific policing parameters; and (b) providing said updated subset-specific policing parameters for use in the performance of a policing operation by said associated access node. Such embodiments may be regarded as "collaborative", in that instead of there being a common control node, the respective access nodes share information with each other, and some or all of them perform functions corresponding to those which would be performed by a common control node in "common control node" embodiments.

The monitoring performed in respect of the individual access nodes may be performed by control agents directly at the access nodes in question, but as an alternative to this, it may be performed by control agents associated therewith located near to, or even distant from those access nodes. Similarly, the other steps performed in respect of the access nodes may also be performed directly at those access nodes or at remotely-located nodes associated therewith.

The policing operation itself may involve simply determining, in respect of one or more received data units and in dependence on updated subset-specific policing parameters and on subset-specific congestion contribution, whether to perform a policing action in respect of one or more of said received data units. It will thus be understood that the "policing operation" may merely involve determining whether or not to perform a "policing action". In such cases, the policing action may comprise one or more of the following, in respect of one or more data units: dropping said one or more of said data units; delaying onward transmission of said one or more of said data units; levying a charge in respect of said one or more data units; assigning a sanction indication in respect of said one or more data units whereby to enable said data units to be identified for subsequent sanction; associating a mark in respect of one or more of said data units in order to enable further policing action to be taken subsequently in respect thereof; or issuing a report to a policing authority in order to enable further policing action to be taken subsequently. Other types of policing action may also be performed.

It will be understood that there are a variety of different ways in which the overall usage may be "partitioned" into individual "usage subsets". In a relatively simple case, the usage may be partitioned simply such that usage via a first access node forms a first subset, usage via a second access node forms a second subset, and so on. Alternatively, the respective usage subsets may relate to usage by different users, for example. Where users are static, there may be a simple correlation between a user and the access node via which that user sends or receives data. Users may, however be mobile, in which case such a simple correlation may be inappropriate—instead, it may be necessary to monitor "user-indications" in individual data units in order to determine the identity of the user concerned, and determine from these which of a plurality of "user-specific" usage subsets the data units are associated with irrespective of the access node via which the data units in question pass on their way to or from the network. Other ways of partitioning the overall usage into individual usage subsets may partition the usage on the basis of one or more of the following: the network application with which the usage is associated; the session with which the usage is associated; class or application-type indications relating to the data units in question (defined by specific flags in the data units, for example); source and/or destination addresses of the data units in question; some higher level property of the data units in question, relating to whether they are associated with "Voice over IP" (VoIP), "Hypertext Markup Language" (HTML), "peer-to-peer" (p2p) or some other category of application; or according to any of a variety of other factors.

In some embodiments, at least some access nodes may be at locations geographically remote from each other. This may be appropriate in relation to the CDN scenario explained earlier, for example, or in relation to corporate customers having several individual users and/or individual access points via which their users may send and/or receive data.

Data units traversing the network via a particular access node may be deemed to be associated with a particular one of said plurality of usage subsets (i.e. allowing a one-to-one correlation between access nodes and usage subsets). Alternatively, data units traversing the network via a particular access node may be deemed to be associated with any one of more than one usage subsets (i.e. allowing a one-to-many or a many-to-many correlation between access nodes and usage subsets). In such cases, the usage subset with which data units are associated may be determined according to factors such as those outlined above in the paragraph relating to manners in which the usage may be "partitioned", or according to other predetermined criteria.

According to preferred embodiments, the data units may have header portions associated therewith, in which case the congestion indications may be provided by one or more fields in said header portions. In a preferred embodiment, a field such as the ECN field in the IP header of an IP packet may be used in this respect.

In scenarios where one or more of the users may be mobile users, mobile user policing agents may be instantiated at each of a plurality of access nodes via which a mobile user is sending or receiving data over the network. Each of said mobile user policing agents may then temporarily perform the monitoring of congestion indications in respect of the successive access nodes via which the mobile user sends or receives data. The transfer from one policing agent to another may take place whenever the mobile user enters a new cell, for example. A central controller may assign parameters for a particular mobile user to the policing agent in the currently active cell for that used, then, when that user enters a new cell, assign their traffic to a new policing agent in the subsequent active cell. Mobile user policing agents that have ceased being used in respect of one mobile user (i.e. one who has now moved on to another cell) may be re-cycled for use in respect of other users, or may be allowed to lapse.

According to a second aspect of the present invention, there is provided apparatus for policing usage by one or more users of a data network, said one or more users being able to send, to receive, or to send and receive data over the network via one or more of a plurality of access nodes, the usage of the data network resulting from respective data units consuming network resources along respective paths across the data network, each of said data units being associated with one of a plurality of subsets of the usage of the data network, said data units having congestion indications associated therewith indicating a measure of their congestion impact, the apparatus comprising:

a plurality of individual agents, each individual agent being operable to perform the following in respect of at least one of said access nodes:
monitoring congestion indications associated with received data units associated with a particular usage subset and determining in dependence on said congestion indications a subset-specific congestion contribution in respect of said usage subset;
performing a policing operation in respect of said received data units in dependence on subset-specific policing parameters associated with said access node and in dependence on said subset-specific congestion contribution; and
providing, to at least one control agent, subset-specific congestion information indicative of said subset-specific congestion contribution;

and
at least one control agent, operable to perform the following:
receiving subset-specific congestion information indicative of respective subset-specific congestion contributions determined in respect of a plurality of said access nodes;
updating an aggregate congestion measure in dependence on said subset-specific congestion contributions;
determining, in respect of at least one of said access nodes, updated subset-specific policing parameters in dependence on said subset-specific congestion contributions and on said updated aggregate congestion measure; and
providing said updated subset-specific policing parameters for use in the performance of a policing operation in respect of said at least one access node.

The various options and preferred embodiments referred to above in relation to the first aspect are also applicable in relation to the second aspect.

As will be understood, according to preferred embodiments, a "per-user" congestion mechanism can be improved by virtue of a new token bucket congestion policer that can police and/or limit a customer's total contribution to congestion in a cloud-based computing environment. Even where a customer can generate traffic to or from a range of distributed sites, the policing behaviour may be performed as if the traffic is all passing the same network interface.

With reference to prior art mechanisms, it will be understood that limiting global resource consumption in a distributed environment has concentrated previously on volume rate limitations. Rate limitation may be appropriate in the current service environment; for example a network provider may wish to limit the total amount of traffic that it carries for a specific customer to a specific rate. Unfortunately, this approach has several drawbacks. Firstly, traffic rate is a metric that may be very difficult to guarantee. It may be difficult for a network provider to ensure the availability of adequate resources to enable each of its customers to reach a specific limit at each site. Secondly, traffic rate is a metric that does not take account of a user's interaction with other users, and therefore does not provide such a good basis for effective resource allocation.

It should also be noted that a network provider incurs minimum operational expenditure (mainly network maintenance) when a capacity is already allocated to a specific location, while costs to upgrade capacity are generally much more significant.

Embodiments of the present invention are therefore based on monitoring the consumption of congestion allowances, rather than volume or absolute rate. It is expected that network utilisation may enjoy considerable benefits from statistical multiplexing. By policing users based on congestion rather than volume alone, an incentive may be given to them to optimise resource allocation depending on their needs—users may then choose which services need priority at peak times (i.e. periods of high congestion) and which can be left in the background to exploit bandwidth during off-peak times.

Preferred embodiments can thus lead to various advantages over prior art mechanisms, including the following:

1) Enhanced Freedom of Service: While a volume rate limit may behave like a strict bandwidth limit, a congestion limit may only restrict traffic when a shared resource is scarce. Briefly, when a network is not congested a user can send as much traffic as its applications require. Each user's usage may then be able to range freely over all dimensions of the resource pool and only be constrained when it restricts or impinges on the freedom of others. The concept behind this approach is that there is little or no economic benefit for a network provider to reduce network utilisation if current demand is lower than the overall capacity.

2) Effective Provisioning of Resources: Considering a scenario where multiple users are sending traffic through multiple remote sites using multiple flows. As congestion rises for a subset of the flows, preferred embodiments may be used to make it advantageous for a customer to have a management layer in order to shift more traffic onto less congested paths, which is feasible if all the remote sites are being used to provide the same service. Prior techniques on limiting volume rate do not deal with effective provisioning strategy.

BRIEF DESCRIPTION OF THE DRAWINGS

A preferred embodiment of the present invention will now be described with reference to the appended drawings, in which:

FIG. 1 shows a schematic diagram of a network via which customers receive data from a multi-sited data provider;

FIG. 2 illustrates the function of a token bucket congestion policer;

FIG. 3 shows how a token bucket congestion policer may be used to police data flows destined for data receivers as they pass from a data provider onto a network;

FIG. 4 shows how congestion may be policed using distributed token bucket policers according to a preferred embodiment of the invention;

FIG. 5(*a*) illustrates the tasks performed respectively by local or individual nodes and the tasks performed by a control node, and how these are inter-related, in policing congestion according to a preferred embodiment of the invention where a plurality of local/individual nodes are under the control of a dedicated control node;

FIG. 5(*b*) illustrates the tasks performed respectively by monitoring/policing agents and control agents of each of a plurality of local/individual nodes, in policing congestion according to an alternative embodiment where there is no dedicated control node; and FIG. 6 illustrates examples of conversion curves which may be used for determining the probability of policing action such as packet dropping being taken once a user exceeds the congestion allowance they have been allocated.

DESCRIPTION OF PREFERRED EMBODIMENTS OF THE INVENTION

The following description will explain how embodiments of the invention may be used in the context of a distributed resource management system, and may be used to enable policing and possible enforcement of a distributed congestion limit among multiple distributed sites and/or users. Preferred embodiments may enable a set of distributed network resources to behave as a single shared resource. For example, a set of disparate connections from a CDN to a network may be controlled as if they are a single "combined" connection.

In an example scenario, we consider a network provider organisation which provides a content delivery service on behalf of one of its customers, which is a multi-sited data providing organisation with 50 content centres (each with CDN servers, for example) at geographically distributed sites. The customer has a Service Level Agreement (SLA) where the aggregate congestion is limited to a congestion volume "C" (for instance in Gigabits per day). This can be expressed as an average throughput of $C/p*1024*8/24/60/60$ (in Megabits per second or Mbps) if the average congestion level "p" is fairly constant over the day.

There are several options for the customer to manage its congestion allowance across the various sites. The customer, with 50 sites, could limit each site to a fixed portion of the total allowance (864 Mb congestion volume per day and 0.01 Mbps congestion rate, for example). However since it is hard for the customer to predict the service demand, there would be times when some sites do not consume all of their allowance, while others run out.

The network architecture may be set up by the network provider to operate in certain ways in order for congestion policing and management to be operable on this basis:

1. Each network resource or node may be set up to mark packets, perhaps randomly, as it approaches congestion (e.g. with ECN marks).

2. End-systems (such as the final computer that the content is being delivered to, for example) may operate a scheme such as re-ECN to allow policer nodes to view congestion caused by the traffic the customer sent to the user over the previous Round Trip Time (RTT) because ECN generally only reveals the congestion at the egress of a resource pool.

In the above scenario, the customer requires a mechanism to manage a distributed usage constraint imposed on the network service provided to the customer by the network provider. Distributed usage may occur in particular when a customer is based at several sites, as would be the case for a CDN arrangement with server farms scattered across a geographical area but located near large population concentrations.

Up until the present, such constraints have generally been expressed in terms of raw volume of traffic or maximum throughput limit, following the practice of Fair Usage Policies applied to the network provision of residential broadband customers, and the SLAs drawn up for the network provision of larger customers such as CDNs. In the future, due to faster fibre-optic broadband services and other factors, for example, it is believed by the present inventors that congestion will be seen as a more appropriate basis on which to control usage of shared resources. Preferred embodiments are thus focused on a usage constraint expressed instead in terms of congestion volume.

The usage allowance may be shared between every location where the customer is present, according to the customer's initial requirements. Usage may be monitored at each attachment point (i.e. at each ingress node to the network provider's network, for example), and reported to at least one control agent on a regular basis. In particular, control agents keep track of the outstanding aggregate token reserve which reflects the fraction of the allowance that hasn't been used to date amongst the different locations. We can envisage several arrangements of the monitoring agents and the control agents. In each of the following cases, individual policers may be located at attachment points between the customer and the network provider as required by the accountability agreement between the customer and the provider. On the other hand, there can be, in particular:
- one single control agent located at a different node than the attachment points
- one single control agent located at one of the attachment points
- one control agent located at each attachment point, all control agents running in parallel.

The options listed above can exist in combination. For example, a hybrid of the first and third arrangements above may involve a network only part of which is under common control. Such a network may be arranged in such a way that some of its individual access nodes are policed under the control of a common control agent, but wherein a number of "transient" individual nodes connect to the network while being policed under the control of their own control agents, for example.

The preferred embodiment will be described principally in terms of the first of these three arrangements, i.e. whereby the control agent is located at a single dedicated "control node" which performs the functions of receiving information from each of the various individual nodes, determining updated parameters for each of the individual nodes, and providing respective updated parameters to the appropriate individual nodes. This arrangement will be discussed with reference to FIG. 4, and its operation will be described with reference to FIG. 5(a). The second of these three arrangements essentially involves one of the individual nodes at one of the attachment points performing the functions of the control agent as well as its own "local" individual monitoring/policing functions—this arrangement will not be discussed in detail. In the third arrangement, whose operation will be discussed later with reference to FIG. 5(b), the individual nodes can be regarded as collaborative and autonomous in that they are self-governing (albeit according to a commonly-imposed set of rules) using information received from each other, rather than each of them providing their own information to a common "dedicated" control node responsible for determining how each of them should adjust its policing behaviour, and for providing information to them enabling them each to adjust their policing behaviour accordingly.

When the congestion allowance reserve at any of the locations gets depleted too quickly due to local demand, an alert can be raised with the control node. Alternatively, the control node can detect such a situation from the reports it receives from the respective locations. Preferred embodiments provide ways to re-allocate any outstanding aggregate token reserve to locations where the local allowance has been nearly exhausted. If this is still not enough, contingency mechanisms can be put in place by the network provider to allow the customer to extend its allowance on request if insufficient reserve is available from other locations.

The following introduces how the customer may manage its allowance in an effective manner. Its individual users essentially compete for bandwidth with other users whose data is traversing the same shared resources at the same time. Ideally, the customer would be able to measure the average congestion demand per user at each location and apportion the aggregate congestion allowance based on that measurement. Unfortunately, there are problems in obtaining sufficiently accurate, let alone completely accurate measurements. In particular, the communication latency between the attachment points and the control node will limit how quickly the system can react to a change in demand.

Policing Congestion with a Distributed Token Bucket

The following introduces how the congestion created at a set of distributed sites may be controlled while enforcing an aggregate congestion limit. The aggregate congestion limiter can be implemented by a token bucket policer.

FIG. 4 illustrates a scenario with a control node 40 and a set of individual nodes 42 serving as attachment points via which data from one or more CDN servers 12 at sites belonging to or acting for a multi-sited data-providing organisation 10 may be received by end-users 44 connected to network 14 in order to receive content they have requested. The data-receiving end-users 44 may each be using different types of user devices, such as desktop computers 181, laptop computers 182, mobile phones 183, etc. The network 14 may for example be a "cloud" network, and for enabling certain preferred embodiments, may support re-ECN.

It should be noted that while the data-receiving end-users 44 may all make separate use of the network as separate customers of the network provider, there are scenarios in which several of them may be at different sites, but be under the control or responsibility of a single entity such as the corporate customer 18 in FIG. 1, which itself could then be a single customer of the network provider, and could thus have a single network service-provision contract with the network provider itself. In such a scenario, alternative embodiments of the invention may then be used to enable this corporate "data-receiving" customer of the network provider to distribute its congestion allowance amongst its individual sites and users.

With reference to the explanation given earlier with reference to FIGS. 2 and 3 of how a token bucket congestion policer may be used to police data flows destined for data receivers as they pass from a data provider onto a network, an individual token bucket policer 420 at each of the respective network attachment points for the distributed sites may be used to provide a simple way of limiting the average rate ($w_i$) as well as its maximum burst size ($b_i$) at each of the sites. For example an individual server could be limited to sending at a long term-average congestion rate of 0.5 Mbps but could occasionally unleash a congestion burst (i.e. a burst of traffic having a congestion impact) up to or equivalent to the whole of its outstanding reserve.

At the control node 40, there is an "aggregate" token bucket policing mechanism 400 (with filling rate W and depth B) that keeps track of how much of the joint congestion allowance the aggregate traffic (from all the locations) effectively consumes. Note that parameters relating to the control node will be indicated using BOLD CAPITALS, while those relating to individual or local nodes will be indicated using normal lower case characters.

While the aggregate token bucket policer 400 at the control node 40 enforces a global limit, the individual token bucket policers 420 at the respective sites enforce local limits. At each site, the amount of congestion experienced by the local traffic is measured, and periodically updates are sent to the control node 40 about the respective local congestion arrival rate. Upon receipt of congestion measurements from all the distributed sites, the control node 40 estimates the overall congestion demand from the customer's individual users (e.g. its CDN servers 12) and if necessary updates the parameters of the individual policers 420.

There are two distinct roles in the system: the "Control Node" 40 polices and maybe enforces a global limit while "Local Nodes" or "Individual Nodes" 42 police and may enforce respective local/individual limits. Communication exchanges between local/individual nodes 42 and the control node 40 are indicated in FIG. 4 by bold dotted straight lines. Communication is required with each individual node to ensure that its local/individual congestion limit is appropriate with respect to the overall consumption of the congestion allowance amongst all of the sites.

The tasks of the control node and the various individual nodes can be separated into various subtasks. This is illustrated in FIG. 5(*a*), which shows the subtasks performed by the control node and one of a plurality of individual nodes and indicates the interactions between them. It should be noted that the control node interacts similarly with each of the other individual nodes as well.

Individual Node Subtasks

1) Measurement of Congestion Demand: Periodic measurement of local congestion demand by summing congestion notifications in packets received at the individual node in question, shown as step s51.

2) Provision of Reports to Control Node: Periodic communication of local congestion demand. By virtue of each individual node providing this information, the control node is able to maintain a synchronised view of the overall token level, representing the amount currently remaining of the customer's overall congestion allowance. This is shown as step s52.

3) Update Individual Policer Parameters: Upon receipt of "update" communications from the control node, each individual node updates its relevant token-bucket parameters. In particular, in preferred embodiments, the local filling rate and local overdraft are updated. Other token-bucket parameters such as the token reserve may also be updated. This is shown as step s53.

4) Apply sanction if bucket is empty: If the bucket is empty the individual node may apply an appropriate sanction based on the token level and overdraft value. This is shown as step s54. (Note that the sanction may involve taking action to enforce a local limit, issuing an appropriate report, or taking other types of action which are not necessarily punitive.)

Control Node Subtasks

1) Receive Reports: at least periodically from every individual node. This is shown as step s55.

2) Update Parameters of Aggregate Policer: in particular the token level. This is shown as step s56.

3) Reassess Parameters for the Individual Policers: The control node re-calculates the average congestion rate experienced at each individual node, and potential changes needed to the policer parameters at every individual node. This is shown as step s57.

4) Communication to Individual Nodes: Periodic communication to individual nodes of any adjustment needed to their respective token bucket parameters. This is shown as step s58.

As explained earlier, in some alternative embodiments it is not necessary for there to be a dedicated "control node". One alternative is for one of the individual nodes at one of the attachment points to perform the functions of the control node as well as its own "local" individual monitoring/policing functions. Another alternative is for the individual nodes to share the necessary information with each other to enable each to determine its own updates, each using an algorithm similar to that which would be used by a control node in the arrangement described earlier. In order to explain how this may operate, the functions of an individual node will be split into "monitoring/policing functions" (corresponding to those performed by each individual node in the arrangement described earlier) and "control functions" (corresponding to those performed by the control node in the arrangement described earlier). In the explanation below, individual nodes will be regarded as comprising a "monitoring/policing agent" and a "control agent", the respective agents being responsible for performing the respective functions for the individual node in question.

FIG. 5(*b*) illustrates the tasks performed respectively by monitoring/policing agents and control agents of each of a plurality of local/individual nodes, in policing congestion according to an alternative embodiment where there is no dedicated control node. Some of the steps correspond to those of FIG. 5(*a*)—these are numbered as they were in FIG. 5(*a*) and will not be explained in further detail here.

The monitoring/policing agent of a particular individual node measures its own local congestion demand (step s51). Then, instead of providing information in respect of this to a control node (as it would do in the embodiment described earlier), the monitoring/policing agent of the individual node in question provides information in respect of this to its own control agent and to the control agents of other individual nodes (step 52*b*). Meanwhile, the monitoring/policing agents of the other individual nodes provide their local information to their own control agents and to the control agents of the other individual node.

Turning now to the subtasks performed by the control agent of the particular individual node, this receives the reports from its own monitoring/policing agents and those of the other individual nodes (step S55*b*), uses this to update its instance of the aggregate token bucket (as would have been done in step s56 by the control node in the embodiment described earlier), re-calculates the congestion rate experienced and the potential changes needed to be made to the policer parameters for its policing operation (step s57). It then communicates update information to its own monitoring/policing agent (step s58*b*) such that this can update its policing parameters (step s53) and applying a sanction if appropriate (step s54).

Note that in embodiments such as those outlined above, a local-node token bucket may be arranged simply to drop a packet when the bucket is empty. This may be appropriate over long timescales, but may not be appropriate in relation to capturing short-term effects due to burstiness and fluctuation in traffic demand. The design may therefore be refined to ensure that packets are dropped with a probability dependent on the local and the aggregate state.

DESCRIPTION OF A PREFERRED EMBODIMENT

Although this more detailed description of a preferred embodiment focuses on a distributed congestion policer which uses, as its policing action, the dropping of packets, it should be remembered that alternative embodiments may use alternative types of policing action, such as delaying packets, levying charges in respect of packets, marking packets (for possible dropping or charging later, for example), or issuing reports to a control node, for example, in order to enable further action to be taken centrally or elsewhere. Some policers may act principally as congestion monitors, simply tallying the proportion of traffic identified by the penalty function without applying penalties to packets, whereas others may apply a more active sanction (drop, charge, delay, report etc.).

We consider the situation where a usage limit is imposed on a multi-sited customer consisting of an allowance A for the amount of congestion volume that can be caused by all of its traffic over a regular period T, for instance a month. This defines the average congestion bit rate the customer can generate: W=A/T (in bits per second or "bps"). Furthermore, a "rollover" flexibility might be defined by setting a limit B to the part of the allowance that can be saved up for future use.

If these terms were used to police a customer based at a single site, this would give the parameters of the bulk congestion policer: the filling rate W and the bucket depth B.

In the present case, these parameters are used for the aggregate token bucket maintained by the control node. A difference is that tokens at the control node are consumed based on the regular reports from the different locations.

Local Policer

Meanwhile, local or individual policers are used in respect of every site to monitor that site's contribution to aggregate congestion. These are also each implemented using a token bucket with the following parameters:

| Filling rate | $w_i$ | in bps |
|---|---|---|
| Bucket depth | $b_i$ | in bits |
| Outstanding congestion reserve | $r_i$ | in bits |
| Local overdraft facility | $d_i$ | in bits |

The filling rate, bucket depth and local overdraft facility are all given by the central control, as explained further down.

We also define the congestion volume $c_i$ generated by the individual user to date. The derivative $c_i'$ of the cumulative congestion volume reflects the individual user's instantaneous demand for consuming the congestion allowance $w_i$.

When the bucket is not empty tokens are added at a rate $w_i$ and consumed at a rate $c_i'$. As a result, the derivative $r_i'$ of the outstanding reserve $r_i$ follows the instantaneous demand, i.e. $r_i'=+w_i-c_i'$, as long as the outstanding reserve remains in the interval $[0 \ldots d_i]$.

The token reserve is capped at $d_i$, so any unused tokens are discarded.

The policing behaviour of this embodiment differs from prior congestion policing techniques with respect to the treatment of the traffic in particular when the token reserve becomes exhausted. Firstly, the local nodes of the distributed policer do not start dropping (or taking other such policing action in respect of) all traffic resulting from the excess demand. Instead, the local token reserve may be allowed to go negative, as explained below (see the section on "Overdraft Behaviour").

Furthermore the policers may be of a "double-limit" type such as that disclosed in co-pending European application EP 09 250 868.8 filed on 26 Mar. 2009 by the same applicant, which uses a leaky bucket mechanism in series with the token bucket mechanism to pace the contribution to congestion of a source in such a way as to allow short-term bursts of congested traffic to be forwarded without sanction even if these are up to a level significantly higher than an agreed "long-term" rate, provided that the congestion allowance over the longer term is not breached.

Local policers report every $\tau$ to the central controller. The report can contain the following information:

| Identity of the site | $i$ | |
|---|---|---|
| Congestion usage since last report | $\Delta c_i$ | in bits |
| Volume forwarded since last report | $\Delta v_i$ | in bits |
| Outstanding token reserve | $r_i$ | in bits |

It should be noted that $\Delta v_i$ relates to the overall volume of data forwarded by the policer in question since its last report, whether congestion-marked or not, as this information may also be used by the central controller, as will be explained below.

Central Controller

The central controller keeps track of the constraint for the aggregate traffic of the customer. It is implemented as a token bucket policer with the following parameters:

the filling rate W is defined in the customer's contract with the network services provider the depth of the bucket B is defined in the contract (note that this need not be defined at all)

the level of the token reserve R keeps track of the outstanding allowance.

In receiving a report, the central controller can establish the average congestion for traffic coming from that site: $p_i=\Delta c_i/\Delta v_i$. The central controller also removes $c_i$ tokens from the central token bucket.

Whenever the central controller has received reports from all of the sites, it updates the parameters of the local policers as follows:

Setting the Filling Rates

The filling rate for the central controller may be set according to the customer's contract with the network service provider. The filling rates for local policers may then be set by the customer's central controller in order to comply with this. For instance the individual filling rates can initially be given as equal shares of the total (contractually-agreed) filling rate. Later the central controller can keep track of the local consumption of each site:

$$\Delta c_{i,est}=\text{EWMA}(\Delta c_{i,\tau})$$

(where "EWMA" refers to an exponentially-weighted moving average), and can assign filling rates $w_i$ to the different sites in the same relative proportion as their average congestion consumption $\Delta c_{i,est}$:

$$w_i=W*\Delta c_{i,est}/\Sigma_i \Delta c_{i,est}$$

First Refinement

If $(1+\alpha)*\Sigma \Delta c_i<W$ then set $w_i=(1+\alpha)*\Delta c_i$ where $\alpha$ is a small constant (the same for all the local policers) and $\Delta c_i$ is retrieved from the latest report from that local policer.

If $(1+\alpha)*\Sigma \Delta c_i>W$ then set $w_i=W*\Delta c_{i,est}/\Sigma_i \Delta c_{i,est}$ This essentially leads to the following behaviour:

the local allowances are assigned in proportion to recent demand as long as the aggregate congestion caused doesn't come close to the limit imposed on the customer, and the allowance is shared in relative proportion to the estimate of the local demand as soon as the aggregate congestion does come close to the limit imposed on the customer.

Second Refinement

It is possible to re-allocate congestion allowance to temporarily boost the congestion limit by re-allocating any outstanding token reserve. This requires changing the last equation in the previous refinement to:

If $(1+\alpha)*\Sigma\Delta c_i > W$ then set $w_i = (W + R/m\tau)*\Delta c_{i,est}/\Sigma_i \Delta c_{i,est}$ where $m\tau$ is the length of the interval over which the reserve can be used to boost the filling rates $w_i$.

Further Refinements

Other estimation techniques may be used instead, which could take account of time of day, or other parameters likely to influence the contribution to congestion. Some of these parameters might be included in the reports from the local nodes to the central controller.

Setting the Overdraft

The preferred option is to have $d_i = R/n$, where n is the number of sites. Other formulae may be used. For instance, the definition of the overdraft may depend on the number of overdrawn sites.

Overdraft Behaviour

The behaviour of the policer when the local token reserve $r_i$ becomes negative (meaning that the local site enters its "overdraft facility") will now be described.

At that point, a given action (such as dropping) may be taken in proportion to the extent to which an individual user exceeds the congestion allowance it has been allocated. The action (such as dropping) is taken with a probability given by a conversion curve such as those shown in FIG. 6. The deeper $r_i$ goes into the overdraft region, the more likely it becomes that the relevant policing action will be taken. The conversion curves are generally decreasing functions of $r_i$. In each of these cases, $f(r_i) = 0$ when $r_i \geq 0$, while when $r_i < 0$ $f(r_i) = 1$ for the step function
$f(r_i) = r_i/d_i$ for the ramp function
$f(r_i) = \sqrt{(1 - r_i^2/d_i^2)}$ for the elliptic function Although the description of a preferred embodiment has focused on enabling the policing of traffic sent from individual data-providing users of a data-providing customer such as the multi-sited content provider 10 in FIG. 1, corresponding mechanisms are equally applicable in relation to traffic being received by individual users of a data-receiving customer such as the corporate/VPN customer of FIG. 1. In fact, monitoring the constraint may simply require looking for different congestion fields in packet headers: upstream congestion for traffic received, and downstream congestion for traffic sent. Downstream congestion may be established as the difference between end-to-end congestion and upstream congestion, for instance the difference between the number of re-ECN and ECN marks.

The operation performed when a packet is received at a local node may correspond essentially to that performed by a single autonomous policer. A fundamental difference however is that the parameters of the local token bucket policer can be reconfigured based on the state of the central token bucket policer.

Further Options

A proportion of the central reserve may be redistributed to any of the local policers, before the adjustments to the overdrafts are done.

If a "double-limit policer" is used in conjunction to the distributed policer, a short-term congestion bit rate allowance may also need updating, for instance to:

$w_{ST,i} = \min(w_{ST}, w_{ST} + (R/n)/T_{update})$ where $T_{update}$ gives the period of the updates and n is the number of local policers controlled by the central node.

Embodiments of the present invention can also be used to perform differential policing at one or more of the nodes. In that case, several independent local policers may be used at each local node. Each of them would perform as a single local policer. This may involve the following changes:

when a packet is received, it is matched to one of the local policers, which can be based on a) the identity of the user; b) the class of the traffic; c) the identity of the flow; or d) any other categorisation rule based for instance on Deep Packet Inspection (DPI) functions; and the central policer updates each local category policer.

This is particularly beneficial in achieving per-flow, per-protocol, or per-sub-user policing, for example.

If a packet cannot be attributed to a category (in particular in the case of a per-flow policer), instantiating a new local policer may be required. For that purpose, the local node may run a few "silent policers", to avoid resorting to admission-controlling new flows. Another refinement consists of "recycling" obsolete policers—for instance a per-flow policer could be re-assigned as a silent policer following a graceful TCP teardown. Other "garbage collection" mechanisms may be also be used, by re-assigning per-flow policers as silent following idle periods exceeding a given period of time.

A distributed policer can also be used to support the mobility of users. In such cases, a new local policer may be instantiated whenever the user enters a new cell (i.e. since the user will be attached to the network via a different attachment point). In order to do this, the central controller may assign parameters to the local policer in the current active cell that are smaller than the parameters the user is entitled to. In this way, when the user enters a new cell, the central controller can immediately assign its traffic to a new local policer with the same filling rate. At the same time, the central controller recycles the previous policer by retrieving the outstanding token level and adding it to that of the central controller.

The amount of tokens consumed by each packet can be defined in several different ways. In particular, for a re-ECN packet of size "s", it could be:

1) to detect end-to-end congestion:
+s if the packet is "black"
2) to detect upstream congestion:
+s if the packet is "red"
3) to detect downstream congestion:
+s if the packet is "black"
−s if the packet is "red"

where "red" means that the packet bears one of the two re-ECN "congestion experienced" codepoints, and "black" means that the packet bears one of the re-ECN "re-echo" codepoints. More elaborate functions may also be used to take into account excessive upstream congestion in the last case.

In practice, various combinations of the variants described above may be implemented, in particular relating to whether it is a (predominantly) data-providing or data-receiving entity for which policing according to embodiments of the invention is required, or both; which entity (if either) is a multi-site entity, and if so, whether the usage is partitioned purely according to geographical considerations (e.g. on the basis of which access node the data flows pass on their path as they enter or leave the network) or on the basis of other considerations, such as which of a plurality of users the data flows are associated with, which of a plurality of applications the data flows are associated with, which of a plurality of sessions the data flows are associated with, which of a plurality of classes the data flows are associated with, etc. Also, the manner of policing may be single-limit congestion policing, double-limit congestion policing, or some other type of congestion policing, using ECN marks in packet headers, re-ECN codepoints, or other types of congestion indications. Various ways of converting congestion indications into "token consumption" have been outlined, but others may of course be applicable in some circumstances.

The invention claimed is:

1. A method of policing usage by one or more users of a data network, said one or more users being able to send, to receive, or to send and receive data over the network via one or more of a plurality of access nodes, the usage of the data network resulting from respective data units consuming network resources along respective paths across the data network, each of said data units being associated with one of a plurality of subsets of the usage of the data network, said data units having congestion indications associated therewith indicating a measure of their congestion impact, the method comprising:

in respect of each of said plurality of access nodes:
monitoring congestion indications associated with received data units associated with a particular usage subset and determining in dependence on said congestion indications a subset-specific congestion contribution in respect of said usage subset, the congestion indications associated with received data units indicating a measure of their congestion impact;
performing a policing operation in respect of said received data units in dependence on subset-specific policing parameters associated with said access node and in dependence on said subset-specific congestion contribution; and
providing, to at least one control agent, subset-specific congestion information indicative of said subset-specific congestion contribution;
and
at said at least one control agent:
receiving subset-specific congestion information indicative of respective subset-specific congestion contributions from a plurality of said access nodes;
updating an aggregate congestion measure in dependence on said subset-specific congestion contributions;
determining, in respect of at least one of said access nodes, updated subset-specific policing parameters in dependence on said subset-specific congestion contributions and on said updated aggregate congestion measure; and
providing said updated subset-specific policing parameters for use in the performance of a policing operation by said at least one access node.

2. A method according to claim 1 wherein each of said plurality of access nodes provides said subset-specific congestion information to a common control agent; and wherein said common control agent performs the steps of (a) determining, in respect of a plurality of said access nodes, said updated subset-specific policing parameters; and (b) providing said updated subset-specific policing parameters for use in the performance of policing operations in respect of said plurality of access nodes.

3. A method according to claim 2 wherein said common control agent is located at one of said plurality of access nodes.

4. A method according to claim 2 wherein said common control agent is at a location remote from said plurality of access nodes.

5. A method according to claim 1 wherein respective access nodes each provide their subset-specific congestion information to associated control agents and to one or more other control agents associated with one or more other access nodes; and wherein each of said control agents performs the steps of (a) determining, in respect of an access node with which it is associated, said updated subset-specific policing parameters; and (b) providing said updated subset-specific policing parameters for use in the performance of a policing operation by said associated access node.

6. A method according to claim 1 wherein said monitoring performed in respect of respective ones of said access nodes is performed at said access nodes, or at nodes associated therewith located at locations remote from said one or more control agents.

7. A method according to claim 1 wherein said policing operation comprises determining, in respect of one or more received data units and in dependence on updated subset-specific policing parameters and on subset-specific congestion contribution, whether to perform a policing action in respect of one or more of said received data units.

8. A method according to claim 7 wherein said policing action comprises one or more of the following in respect of one or more data units: dropping said one or more of said data units; delaying onward transmission of said one or more of said data units; levying a charge in respect of said one or more data units; assigning a sanction indication in respect of said one or more data units whereby to enable said data units to be identified for subsequent sanction; associating a mark in respect of one or more of said data units in order to enable further policing action to be taken subsequently in respect thereof; or issuing a report to a policing authority in order to enable further policing action to be taken subsequently.

9. A method according to claim 1 wherein different usage subsets of said plurality of usage subsets relate respectively to usage by different users, usage by different network applications, usage during different sessions, usage involving packets having different class or application-type indications, usage involving packets having different source or destination addresses, or usage via different access nodes.

10. A method according to claim 1 wherein said plurality of access nodes comprise access nodes at locations geographically remote from each other.

11. A method according to claim 1 wherein data units traversing the network via a particular one of said plurality of access nodes are deemed to be associated with a particular one of said plurality of usage subsets.

12. A method according to claim 1 wherein data units traversing the network via a particular one of said plurality of access nodes are deemed to be associated with any of more than one of said plurality of usage subsets according to other predetermined criteria.

13. A method according to claim 1 wherein said data units have header portions associated therewith, and wherein said congestion indications are provided by one or more fields in said header portions.

14. A method according to claim 1 wherein mobile user policing agents are instantiated at each of a plurality of access nodes via which a mobile user is sending or receiving data over the network, each of said mobile user policing agents temporarily performing said monitoring in respect of the access node via which said mobile user is sending or receiving data.

15. Apparatus for policing usage by one or more users of a data network, said one or more users being able to send, to receive, or to send and receive data over the network via one or more of a plurality of access nodes, the usage of the data network resulting from respective data units consuming network resources along respective paths across the data network, each of said data units being associated with one of a plurality of subsets of the usage of the data network, said data units having congestion indications associated therewith indicating a measure of their congestion impact, the apparatus comprising:

a plurality of individual agents, each individual agent being operable to perform at least the following in respect of at least one of said access nodes:

monitoring congestion indications associated with received data units associated with a particular usage subset and determining in dependence on said congestion indications a subset-specific congestion contribution in respect of said usage subset, the congestion indications associated with received data units indicating a measure of their congestion impact;

performing a policing operation in respect of said received data units in dependence on subset-specific policing parameters associated with said access node and in dependence on said subset-specific congestion contribution; and providing, to at least one control agent, subset-specific congestion information indicative of said subset-specific congestion contribution;

and at least one control agent, operable to perform at least the following:

receiving subset-specific congestion information indicative of respective subset-specific congestion contributions determined in respect of a plurality of said access nodes;

updating an aggregate congestion measure in dependence on said subset-specific congestion contributions;

determining, in respect of at least one of said access nodes, updated subset-specific policing parameters in dependence on said subset-specific congestion contributions and on said updated aggregate congestion measure; and providing said updated subset-specific policing parameters for use in the performance of a policing operation in respect of said at least one access node.

16. The apparatus according to claim 15 wherein:
each of said plurality of access nodes is configured to provide said subset-specific congestion information to a common control agent; and
said common control agent is configured to perform (a) a determination, in respect of a plurality of said access nodes, of said updated subset-specific policing parameters and (b) a provision of said updated subset-specific policing parameters for use in the performance of policing operations in respect of said plurality of access nodes.

17. The apparatus according to claim 15 wherein:
each of the respective access nodes is configured to provide their subset-specific congestion information to associated control agents and to one or more other control agents associated with one or more other access nodes; and
each of said control agents is configured to perform (a) a determination, in respect of an access node with which it is associated, of said updated subset-specific policing parameters and (b) a provision of said updated subset-specific policing parameters for use in the performance of a policing operation by said associated access node.

18. The apparatus according to claim 15 wherein:
the monitoring performed in respect of respective ones of said access nodes is configured to be performed at said access nodes, or at nodes associated therewith located at locations remote from said one or more control agents.

19. The apparatus according to claim 15 wherein:
said policing operation comprises a determination, in respect of one or more received data units and in dependence on updated subset-specific policing parameters and on subset-specific congestion contribution, of whether to perform a policing action in respect of one or more of said received data units.

20. The apparatus according to claim 15 wherein:
mobile user policing agents are instantiated at each of a plurality of access nodes via which a mobile user is sending or receiving data over the network, each of said mobile user policing agents being configured so as to temporarily perform said monitoring in respect of the access node via which said mobile user is sending or receiving data.

* * * * *